United States Patent [19]

Mickelson et al.

[11] Patent Number: 4,588,238
[45] Date of Patent: May 13, 1986

[54] TELEPHONE NETWORK INTERFACE CONNECTOR

[75] Inventors: N. Peter Mickelson, Gorham; John J. Napiorkowski, Cape Elizabeth, both of Me.

[73] Assignee: GTE Products Corporation, Stamford, Conn.

[21] Appl. No.: 683,739

[22] Filed: Dec. 19, 1984

[51] Int. Cl.⁴ ............................................. H01R 13/62
[52] U.S. Cl. ................................ 339/91 R; 339/94 A; 339/176 M
[58] Field of Search ...................... 339/94, 218, 275 R, 339/91 R, 59–61, 255 R; 179/178, 179, 98

[56] References Cited

U.S. PATENT DOCUMENTS

| | | | |
|---|---|---|---|
| 2,458,153 | 1/1949 | Festge | 339/94 R |
| 2,669,702 | 2/1954 | Klostermann | 339/255 R |
| 3,079,580 | 2/1963 | Paasche | 339/94 R |
| 3,197,730 | 7/1965 | Hargett | 339/218 M |
| 3,445,805 | 5/1969 | McLoad | 339/94 R |
| 3,816,641 | 6/1974 | Iversen | 339/218 R |
| 3,842,393 | 10/1974 | Glover et al. | 339/60 M |
| 4,032,214 | 6/1977 | McNerney | 339/218 M |
| 4,053,201 | 10/1977 | Grappe | 339/218 R |
| 4,452,501 | 6/1984 | Gladd et al. | 339/91 R |
| 4,488,008 | 12/1984 | Dellinger et al. | 179/179 |

Primary Examiner—Gil Weidenfeld
Assistant Examiner—David L. Pirlot
Attorney, Agent, or Firm—James Theodosopoulos

[57] ABSTRACT

A telephone interface connector comprises a plug inserted into a jack and protected against the environment by a resilient sealing member. Encapsulants seal the wires at the points at which the wires exit the plug and the jack.

4 Claims, 3 Drawing Figures

TELEPHONE NETWORK INTERFACE CONNECTOR

This invention concerns telephone interface connectors. Such connectors provide the interface between telephone company-owned wiring and customer-owned wiring. In the past, such connectors have generally been located indoors. Now, however, with massive transformation occurring in the telephone industry, such connectors are more often being located outdoors, say, on the side of a building. It is often required that the connector be the RJ-11C connector, which comprises a four or six contact modular plug and jack. Such a connector is shown in U.S. Pat. Nos. 3,954,320, 3,444,329 and 3,369,214. Such prior art connectors are not suitable for outdoor use. It is a purpose of this invention to provide an environmentally sealed telephone interface connector that is resistant to degradation by weather, fungus, insects and the like.

A telephone interface connector in accordance with this invention comprises a modular plug and a jack into which the plug is inserted. The plug has metal contacts for making electrical contact with matching metal contacts in the jack. There is a mating surface on the plug which mates with a corresponding mating surface on the jack. When the plug is inserted into the jack, the gap between the two mating surfaces is small. There is a resilient sealing member in the gap, which is peripheral to the insertable portion of the plug and jack. Means for maintaining compression between the two mating surfaces is provided, so that the resilient sealing member is under compression to ensure that a seal is maintained between the two mating surfaces. The metal contacts of both the plug and jack are connected to wires which, at the points at which they exit the plug and the jack, are sealed with a suitable encapsulant.

Figure 1:
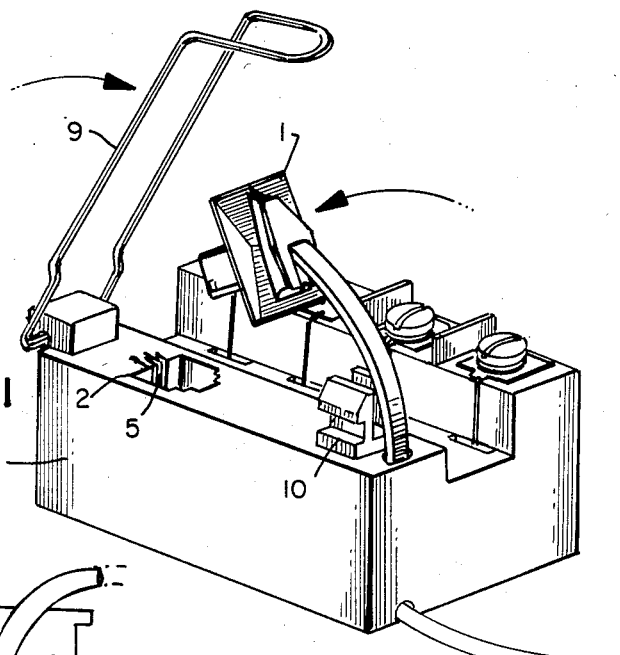
FIG. 1 is a perspective view of a connector in accordance with this invention showing the plug and jack separated.
Figure 2:
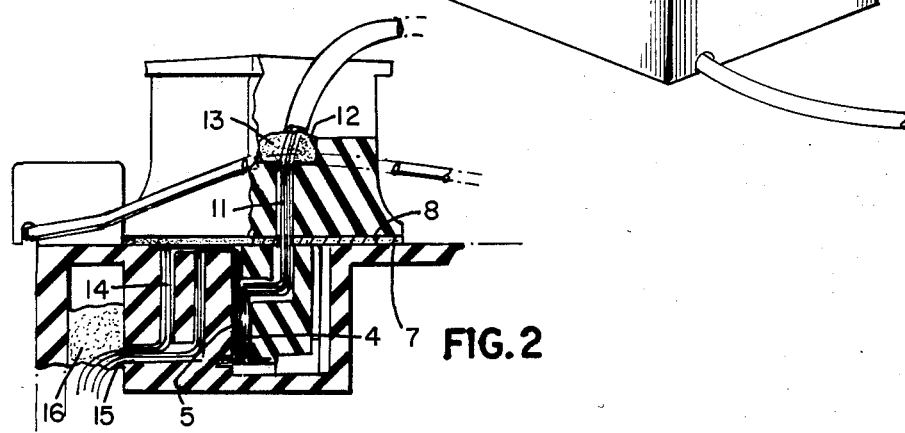
FIG. 2 is a sectional view.
Figure 3:
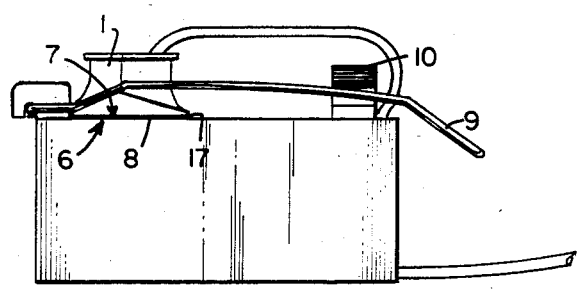

FIG. 3 a side view, showing the plug inserted in the jack.

One example of a telephone interface connector in accordance with this invention, as shown in the drawing, comprises a plug 1 part of which fits into a jack 2 contained within a jack housing 3. There are four metal contacts 4 on plug 1 which make electrical contact with four corresponding metal contacts 5 in jack 2. The spacing between adjacent metal contacts is very small, typically only about 20 mils, which makes an unprotected connector especially susceptible to environmental degradation. There is a surface 6 on housing 3 which mates with, but is slightly separated from, a corresponding mating surface 7 on plug 1, when plug 1 is inserted into jack 2. Disposed in gap 17 between surfaces 6 and 7 is a resilient sealing member 8, made, for example, of rubber, which encircles the inserted part of plug 1. Resilient member 8 is sealingly maintained in compression by means of spring retaining clip 9 which, when locked in retainer 10, presses on the back of plug 1. Metal contacts 4 are connected to wires 11 which exit plug 1 at hole 12. Hole 12 is sealed by an encapsulating material 13, for example, a polyurethane resin. Metal contacts 5 are connected to wires 14 which exit housing 3 at hole 15. Hole 15 is sealed by a similar encapsulating material 16. Since the only moisture paths to the points of contact of prongs 4 and 5 are through holes 12 and 15 and gap 17, all of which are sealed, the connector is protected from the environment. Yet, simply by disengaging clip 9, plug 1 can be unplugged if desired, say for testing a telephone or testing the integrity of the telephone circuit.

For purposes of this invention, it is not necessary that the mating surfaces between the plug and jack be flat as in the drawing. For example, the plug and jack could each be part of cylindrical housings, one of which nests in the other. In such a case the resilient sealing member that seals the gap between the two cylindrical housings could be, for example, a rubber O-ring encircling the inner cylindrical housing and retained on a groove thereon. The diameter of the O-ring could be slightly larger than the inner diameter of the outer cylindrical housing so that the O-ring is maintained in compression when the inner cylindrical housing is inserted into the outer cylindrical housing.

We claim:

1. A telephone interface connector comprising: an RJ11C modular plug; an RJ11C jack, in a jack housing, into which the RJ11C modular plug is inserted; metal contacts on the RJ11C modular plug for making electrical contact with matching metal contacts in the RJ11C jack when the plug is inserted into the jack; a mating surface on the plug which mates with a corresponding mating surface on the jack, there being a small gap between the two mating surfaces when the plug is inserted into the jack; a resilient sealing member in the gap for environmentally sealing the contacts; means for maintaining the resilient sealing member in compression when the plug is inserted into the jack; the metal contacts of the plug being connected to wires which exit the plug through a hole which is environmentally sealed with an encapsulant; the metal contacts of the jack being connected to wires which exit the jack housing through a hole which is environmentally sealed with an encapsulant; the combination of the resilient sealing member and the encapsulants providing environmental protection for the connector, said means for maintaining the resilient sealing member in compression being readily disengageable; the relationship of the RJ11C plug and the RJ11C jack being such that when said means is disengaged, said RJ11C plug can be readily unplugged and another RJ11C plug connected to a telephone can be inserted into said jack for the purpose of testing the telephone, said original RJ11C plug remaining fastened to the telephone interface connector while unplugged from the jack.

2. The connector of claim 1 wherein the resilient sealing member encircles the inserted part of the plug.

3. The connector of claim 1 wherein the resilient sealing member is sealingly maintained in compression by means of a spring retaining clip.

4. The connector of claim 1 wherein said mating surfaces are flat.

* * * * *